April 24, 1956    W. B. McLEAN    2,743,412
A. C. POWER SUPPLY
Filed Nov. 13, 1953
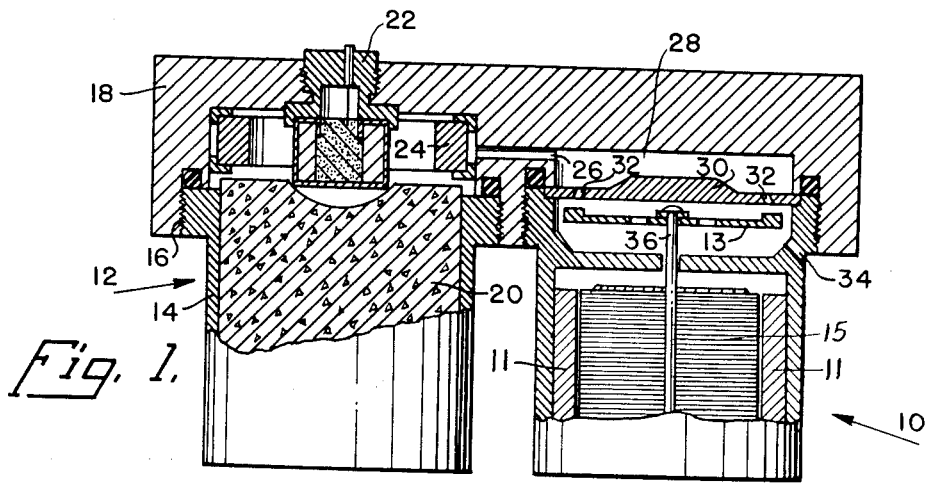
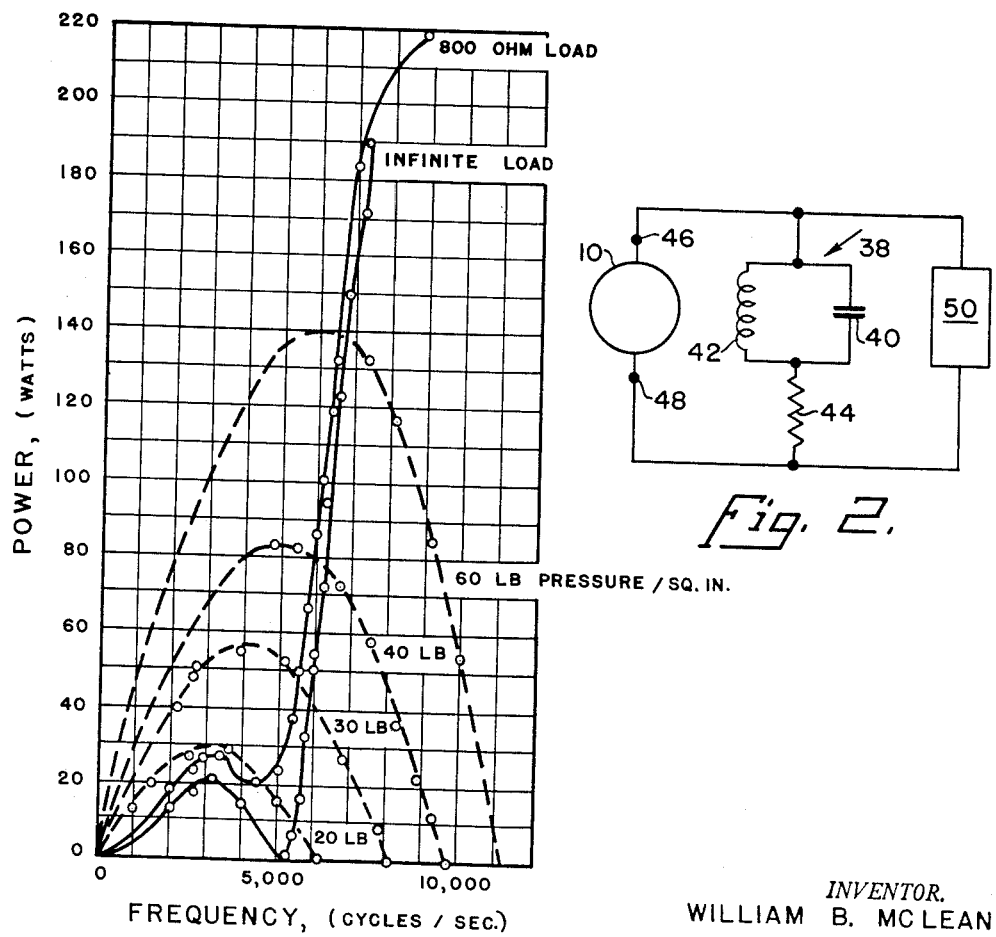
INVENTOR.
WILLIAM B. MCLEAN
BY
ATTORNEYS ns of the A. C. supply system;

United States Patent Office

2,743,412
Patented Apr. 24, 1956

2,743,412

A. C. POWER SUPPLY

William B. McLean, China Lake, Calif., assignor to the United States of America as represented by the Secretary of the Navy Application November 13, 1953, Serial No. 392,064

6 Claims. (Cl. 322—96)

(Granted under Title 35, U. S. Code (1952), sec. 266)

The invention described herein may be used by or for the government of the United States of America for governmental purposes without the payment of any royalties thereon or therefor.

This invention relates to an A. C. power supply for guided missiles and in particular to means for regulating the frequency and magnitude of the output voltage of the power supply.

Guided missiles, particularly those which have incorporated in them magnetic amplifiers, need a reliable source of high frequency alternating current. Because weight and space limitations in missiles are very critical, the volume and weight of the power supply must be kept at a minimum. At the same time, the power supply must also be reliable since improper operation, or failure to operate, will result in an unsuccessful flight by the missile. Since guided missiles are subject to large accelerations and vibrations, all components of the supply system must be strong enough to operate properly irrespective of the accelerations and vibrations to which the power supply is subjected.

The efficiency of the power supply need not be great since in general the length of the period of time it operates is measured in seconds. Further, the frequency and the voltage regulating means of the power supply need not be extremely accurate; however, it must be sufficiently accurate to keep the frequency and the amplitude of the output voltage of the power supply within desired limits.

The power supply of this invention uses a gas turbine to drive the rotor of a magneto alternator. The pressurized gases for the turbine are obtained from a slow burning propellant. Since the load of the alternator is substantially constant, no frequency and amplitude regulating means for the output voltage of the alternator would be needed if the rate at which the gas is evolved from the burning propellant was always the same. Since this is not the case some form of regulating means to maintain the frequency and amplitude of the output voltage within desired limits is necessary.

It is, therefore, an object of this invention to provide a light weight and compact power supply for guided missiles.

It is a further object of this invention to provide a power supply for missiles which has incorporated therein frequency and voltage regulating means.

It is a further object of this invention to provide a power supply which has incorporated therein frequency and voltage regulating means, all the elements of which are passive.

Other objects and many of the attendant advantages of this invention will be readily appreciated as the same become better understood by reference to the following detailed description when considered in connection with the accompanying drawings wherein:

Fig. 1 is a side elevation, portions being broken away to the longitudinal central axis of the A. C. supply;

Fig. 2 is a wiring diagram of the frequency regulating means of the A. C. supply system;

Fig. 3 is a plot of the power output of the A. C. generator plotted against frequency of the output voltage.

In Fig. 1 A. C. generator, or magneto alternator, 10 is of a conventional design which uses permanent magnets 11 to provide the field, so that the magnitude and the frequency of the output voltage of generator 10 increases linearly as the angular velocity of the rotor 15 of generator 10 increases. Power to drive A. C. generator 10 is obtained from gas generator, or other source of pressurized fluid, 12 and turbine 13. Gas generator 12 comprises a hollow cylinder 14 closed at one end. The other end of cylinder 14 is provided with threads 16 to permit cylinder 14 to be secured to base 18. Means which evolves gas at substantially a constant rate, such as a slow burning double base propellent grain 20, is located within the combustion chamber formed by cylinder 14 and base 18. An igniter 22 for grain 20 is threadably mounted in base 18. When the propellent grain 20 is ignited, gas, which is evolved, passes through ceramic filter 24, which removes any solid particles that may be present, and passes through orifice 26 into manifold 28. One of the boundaries of manifold 28 is formed by wall member 30 which is held in position between base 18 and A. C. generator 10 which is threadably secured to base 18. A plurality of orifices 32 formed in member 30 direct the gas within manifold 28 against the buckets, which are not illustrated, of turbine 13 of a gas turbine. The gases after expanding to drive turbine 13 escape to atmosphere through a plurality of orifices 34 formed through the outer wall of A. C. generator 10. Turbine 13 drives the rotor 15 of A. C. generator 10 by means of shaft 36.

Referring to Fig. 2, the regulating means for A. C. generator 10 consists of a parallel resonant circuit 38, formed by capacitance 40 and inductance 42, and a dissipating resistor 44 which is connected in series with resonant circuit 38. The regulating means is connected across the output terminals 46, 48 of A. C. generator 10. Substantially constant load impedance 50 is connected across terminals 46, 48 in parallel with resonant circuit 38 and resistor 44.

At frequencies of the output voltage of A. C. generator 10 which are less than the resonant frequency of circuit 38, the power dissipated in resistor 44 and impedance 50 rises as the square of the frequency since the magnitude of the output voltage of generator 10 is proportional to the frequency of the output voltage. As the frequency of the output voltage approaches the resonant frequency of tuned circuit 38, the impedance of circuit 38 becomes large and reduces the power lost in resistor 44 to zero. This reduction in power being dissipated causes the frequency of the output voltage of A. C. generator 10 to quickly pass through the resonant frequency of circuit 38. At frequencies above resonance the power dissipated by resistor 44 rises rapidly until the total power dissipated in the regulating means and in impedance 50 matches the useful power output of turbine 13. The useful power output of turbine 13 is the shaft power of turbine 13 multiplied by the efficiency of generator 10.

In Fig. 3 the useful power in watts of a preferred type of turbine 13 is plotted against frequency of the output voltage which is a function of the angular velocity of turbine 13. One of the solid curves is the plot of the power dissipated against frequency when the value of impedance 50 is infinite, and the other is a plot of the power dissipated against frequency when the value of impedance 50 is 800 ohms. The useful power output of gas turbine 13 is shown as dotted lines for various constant values of gas pressure within manifold 28. The intersection of the dotted and solid curves determines the frequency of the output voltage for any given value of input pressure.

In a preferred embodiment the following values of the constants were found to be desirable:

Capacitance 40, 0.25 microfarad
Inductance 42, 4.0 millihenries
Resistor 44, 200 ohms.

The resonant frequency of circuit 38 is 5000 cycles/second and the desired frequency of the output voltage of generator 10 is 6000 cycles/second. The very rapid increase in the load of generator 10 as frequency increases above the resonant frequency of circuit 38 maintains the frequency and the amplitude of the output voltage within the desired range of values even though the pressure within manifold 28 may have substantial variations in value.

Since the amplitude of the output voltage of generator 10 increases as the linear function of frequency, the frequency regulating means also regulates the amplitude of the output voltage and limits output voltage to variations of ±15% under the worst conditions which occur when the pressure in manifold 28 is just sufficient to produce a frequency of the output voltage which is above resonant frequency of circuit 38. Improved regulation occurs if the pressure in manifold 28 is maintained somewhat above this value.

In addition to regulating the frequency and amplitude of the output voltage of A. C. generator 10, the frequency regulating means also improves the wave form of the output voltage since the impedance of the regulating means is relatively low for frequencies other than the resonant frequency of circuit 38.

From the foregoing it can be seen that the A. C. power supply which is small and compact and which has a simple and reliable regulating system makes this particular power supply particularly suitable for use in guided missiles.

Obviously many modifications and variations of the present invention are possible in the light of the above teachings. It is, therefore, to be understood that within the scope of the appended claims the invention may be practiced otherwise than as specifically described.

What is claimed is:

1. An A. C. power supply comprising an A. C. generator having a permanent magnet to provide the field and adapted to produce an output voltage, a gas generator, motor means adapted to be operated by gas from said gas generator and operatively connected to said A. C. generator, and regulating means comprising a parallel resonant circuit and a dissipating resistor connected in series, said regulating means adapted to have the output voltage of said generator applied thereacross.

2. An A. C. power supply comprising a gas generator adapted to evolve gas at a substantially constant rate, a magneto alternator, a turbine wheel adapted to be rotated by the gas from said gas generator and operatively connected to said magneto, and regulating means comprising a parallel resonant circuit and a dissipating resistor connected in series, said regulating means connected to have the output voltage of said magneto applied thereacross.

3. An A. C. power supply comprising a gas generator, said gas generator comprising means forming a combustion chamber, a solid slow burning double base propellant within said chamber, and means for igniting said propellant, a gas turbine, means communicating said combustion chamber and said turbine, a magneto alternator adapted to produce an output voltage, and frequency and voltage regulating means comprising a parallel resonant circuit in series with a dissipating resistor, said regulating means connected to have the output voltage of said magneto alternator applied thereacross.

4. A frequency control circuit for an A. C. generator whose output voltage increases linearly with frequency, comprising a parallel resonant circuit having a resonant frequency slightly less than the desired frequency of the output voltage of the generator, and a resistor connected in series with said resonant circuit, said control circuit adapted to have applied thereacross the output voltage of said generator.

5. In combination with a magneto alternator, a frequency regulating means comprising a parallel resonant circuit having a resonant frequency slightly less than the desired frequency of the output voltage of the magneto alternator, a dissipating resistor connected in series with said resonant circuit, said resonant circuit and resistor connected to have the output voltage of said magneto alternator applied thereacross.

6. In combination with a magneto alternator adapted to generate an output voltage which is adapted to be applied to a substantially constant load impedance, frequency regulating means for said magneto alternator comprising a parallel resonant circuit having a resonant frequency slightly less than the desired frequency of the output voltage of said magneto alternator and a dissipating resistor connected in series with said resonant circuit, said frequency regulating means adapted to be connected in parallel with the load impedance of the magneto alternator.

References Cited in the file of this patent

UNITED STATES PATENTS

| | | |
|---|---|---|
| 1,477,782 | Steinmetz et al. | Dec. 18, 1923 |
| 2,021,754 | Suits | Nov. 19, 1935 |